United States Patent [19]

Morisawa

[11] Patent Number: 4,626,918

[45] Date of Patent: Dec. 2, 1986

[54] PHOTOMETRIC OPTICAL SYSTEM FOR SINGLE-LENS REFLEX ELECTRONIC PHOTOGRAPHIC CAMERA

[75] Inventor: Tahei Morisawa, Tokyo, Japan

[73] Assignee: Asahi Kogaku Kogyo Kabushiki Kaisha, Tokyo, Japan

[21] Appl. No.: 684,124

[22] Filed: Dec. 20, 1984

[30] Foreign Application Priority Data

Dec. 21, 1983 [JP] Japan .......................... 58-195450[U]

[51] Int. Cl.$^4$ ............................................ H04N 5/225
[52] U.S. Cl. .................................... 358/225; 358/909
[58] Field of Search ............... 358/225, 228, 209, 224, 358/909; 354/478, 479, 476, 477, 224, 225, 152, 155, 219

[56] References Cited

U.S. PATENT DOCUMENTS 3,710,699  1/1973  Mitani .................................. 354/479
4,172,646 10/1979  Matsumoto ......................... 354/478
4,366,501 12/1982  Tsunekawa et al. ................ 358/909

Primary Examiner—Gene Z. Rubinson
Assistant Examiner—Stephen Brinich
Attorney, Agent, or Firm—Christie, Parker & Hale

[57] ABSTRACT

A portion of the light passing through the compensation filter of a viewfinder optical system is diverted to a photometric member for the purpose of generating a signal representative of the intensity of the light passing through the objective of a single-lens reflex electronic photographic camera. Preferably, the compensation filter is constructed as a beam splitter; the adjoining flat surfaces of two pieces of optical material are cemented together by a material that forms a semi-transmissive coating therebetween.

6 Claims, 3 Drawing Figures

PHOTOMETRIC OPTICAL SYSTEM FOR SINGLE-LENS REFLEX ELECTRONIC PHOTOGRAPHIC CAMERA

BACKGROUND OF THE INVENTION

The present invention relates to a single-lens reflex electronic photographic camera and, more particularly, to a photometric optical system for such a camera.

An electronic photographic camera is generally so constructed that a light beam coming through the objective from an object to be photographed is directed to a pickup device, which generates an electrical video signal representative of the object image. This video signal is stored in a magnetic disc or a semiconductor memory. Such electronic photographic camera is worthy of attention as a substitute for the conventional photographic camera requiring a chemical emulsion to store the object image.

The pickup device is a so-called self-scanning photoconductive device comprising a plurality of small photoconductive elements arranged in an array and adapted to output their stored electric charges successively. Various types such as MOS and CCD are already well known as self-scanning photoconductive devices. In each case, the respective small photoconductive elements are slightly spaced from one another in the array, so the brightness of the object image can be sampled in successive discrete image elements corresponding to the respective photoconductive elements for conversion into an electric signal. In this process, a false signal can occur as the spatial frequency of the object image increases close to the sampling frequency of the pickup device, and consequently undesired phenomena, such as Moire patterns, appear in the image signal, deteriorating its quality.

To avoid such adverse effects, an optical low-pass filter is commonly employed in the light path for photographing so that the high-frequency component is rejected. Consequently, the light beam coming from the object only enters the pickup device after the unnecessary high-frequency component has been removed. The optical low-pass filter may be, for example, a quartz plate or a phase filter. Such optical low-pass filter is optically effective no matter where the filter is located in the light path for photographing extending from the objective to the pickup device. Accordingly, the filter may be located in front of or behind an image-reflecting mirror adapted to reflect the light beam for photographing towards the viewfinder optical system. When the filter is located in front of the mirror, i.e., immediately behind the objective, however, more space is required to avoid interference between the filter and the top of the mirror during its upward swing. As a result, the photographic camera becomes more bulky. Such arrangement is optically also disadvantageous because the light beam without its high-frequency component incident upon the focusing plate of the viewfinder optical system also makes focusing detection difficult.

This problem is avoided by locating the optical low-pass filter behind the image-reflecting mirror and inserting a compensation filter optically equivalent to the optical low-pass filter immediately in front of the focusing plate of the viewfinder optical system. As a result of the compensation plate, there is no difference in the spherical aberration after transmission through the objective or no difference of focusing between the viewfinder image and the actual photographed image.

In the single-lens reflex electronic photographic camera, no light beam enters into the pickup device except during the photographing operation and a photometric element must be located in the light path of the viewfinder optical system for exposure display during observation of an object to be photographed through the viewfinder and for exposure control. Conventionally, a beam splitter is located behind the focusing plate to divert a portion of the light from the light path or the photometric element is located so as to be optically orientated obliquely of the focusing plate or the viewfinder optical axis so that the photometric element does not obstruct observation of the viewfinder image.

SUMMARY OF THE INVENTION

According to the invention, a portion of the light passing through the compensation filter of a viewfinder optical system is diverted to a photometric member for the purpose of generating a signal representative of the intensity of the light passing through the objective of a single-lens reflex electronic photographic camera. The compensation filter has an equivalent optical length with the low pass filter of the system. Preferably, the compensation filter is constructed as a beam splitter; the adjoining flat surfaces of two pieces of optical material are cemented together by a material that forms a semi-transmissive coating therebetween. As a result of the straight incidence of light on the photometric element, it generates a signal that is more representative of the light intensity of the object being photographed than in the case of oblique incidence and a more compact construction is possible. Further, due to the size of the light-receiving area of the photometric element, spot measuring at the central portion of the image and center-weighted averaging of light measurement are possible.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
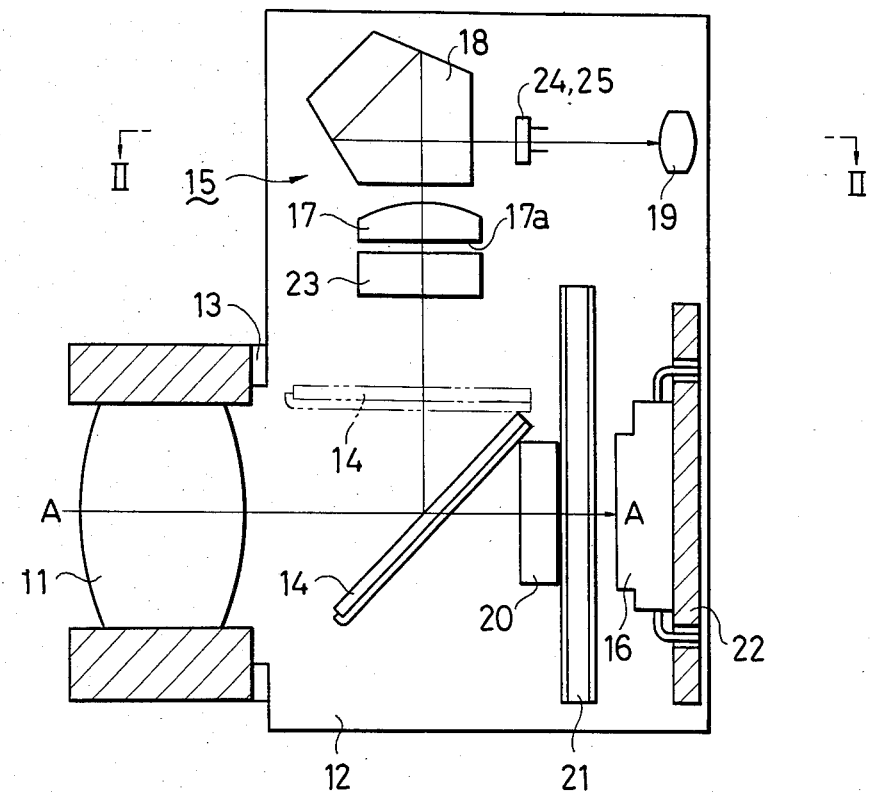
FIG. 1 is schematic side-sectional view of an electronic photographic camera illustrating a viewfinder optical system of the prior art.
Figure 2:
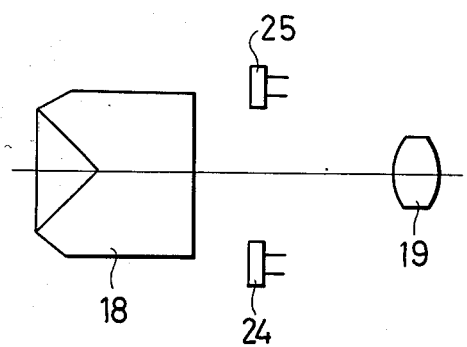
FIG. 2 is a schematic top view of the viewfinder optical system of FIG. 1.

The construction of the prior art arrangement including a pair of photometric elements located obliquely behind the pentaprism is shown by way of example, in FIGS. 1 and 2. FIG. 1 is a vertical section of the electronic camera of the prior art and FIG. 2 is a section taken along a line II—II in FIG. 1. Reference numeral 11 designates an objective, 12 a camera body, and 13 a mount by which the objective 11 is coupled to camera body 12. A line A—A designates an optical axis for photographing, along which a pivotable reflecting mirror 14, which is well known in the single-lens reflex camera art, an optical low-pass filter 20, a shutter 21, and solid self-scanning photoconductive pickup device 16 are located. Low-pass filter 20 can comprise a quartz plate or a phase filter. The pickup device 16 is carried by a circuit board 22. A phantom line indicates the alternative position into which the reflecting mirror 14 is pivoted during photographing responsive to shutter release.

A light beam reflected from the reflecting mirror 14 is directed to the eye of a photographer through a viewfinder optical system 15 comprising a compensation filter 23 optically equivalent to the optical low-pass filter 20, a focusing plate 17 having a focusing plane 17a and serving also as a condenser lens, a pentaprism 18, and an ocular 19. Photometric elements 24,25 are, as seen in FIG. 2, spaced laterally a distance from the viewfinder optical axis between the pentaprism 18 and the ocular 19 so that these photometric elements may be exposed to the light beam obliquely reflected by the pentaprism 18 without obstructing the view of the photographer.

This prior art construction has often provided improper photometric results due to the fact that the amount of light passing through the objective and the amount of light measured behind the focusing plate 17 are not proportional to each other because of the diffusive effect of the focusing plane 17a.

Furthermore, the prior art construction has been disadvantageous also in that the amount of light incident upon the photometric elements is reduced by the focusing plate and some countermeasure against noise is necessary in the following electronic circuit.

Figure 3:
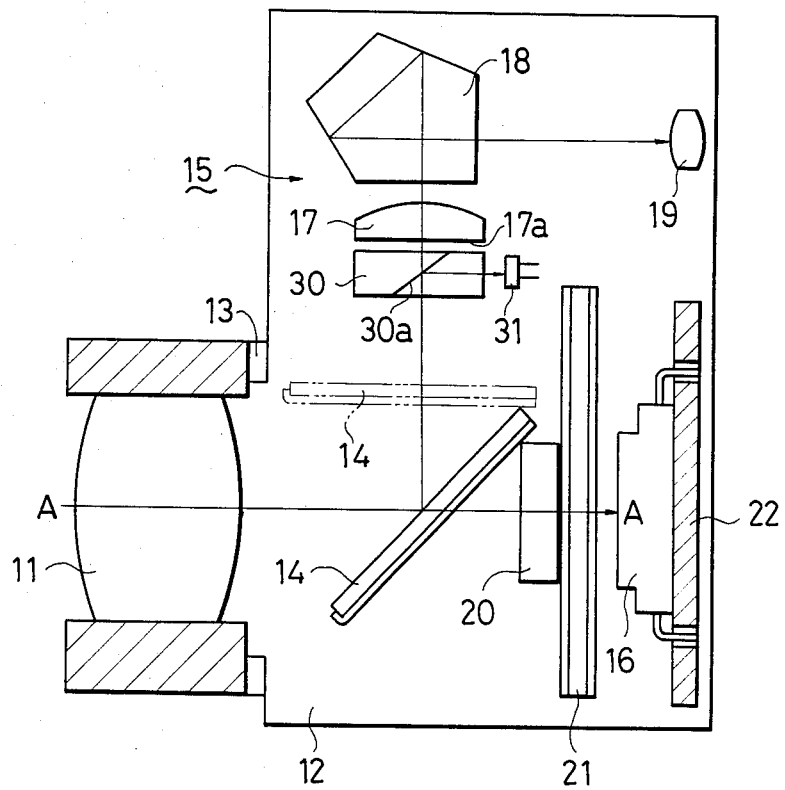
FIG. 3 is a schematic side-sectional view of an electronic photographic camera illustrating a viewfinder optical system incorporating the principles of the invention.

The present invention will be described in detail with reference to FIG. 3 showing, in a vertical section, a preferred embodiment of the present invention. The same parts as those in FIG. 1 are designated by the same reference numerals as in FIG. 1.

In the device according to the present invention, an objective 11 is coupled by a mount 13 to a camera body 12. The camera body 12 is provided with an image-reflecting mirror 14 adapted to direct light rays coming through the objective 11 to a viewfinder optical system 15; mirror 14 is pivotally mounted on a pivot (not shown) arranged behind and above the mirror. Such a mechanism is generally well known in connection with the single-lens reflex camera art. This image-reflecting mirror 14 is normally held by a position-regulating mechanism (not shown) of well-known art at an angle of 45° relative to the optical axis A—A and functions to direct the light beam coming through the objective 11 from an object to be photographed to the viewfinder optical system 15. Upon depression of a shutter release button, the mirror retracts out of the path of the light beam as shown by the phantom lines. The viewfinder optical system 15 comprises a focusing plate 17 serving also as a condenser lens and having its focusing plane 17a conjugate with the plane of the pickup device 16, a pentaprism 18 and an ocular 19 so that a photographer may observe through ocular 19 an erected image of the object coming through the objective 11. An optical low-pass filter 20 is located in front of a shutter 21. A solid pickup device 16 carried by a circuit board 22 is located behind shutter 21.

A compensation plate 30, one of the features of the present invention, is located under the focusing plate 17 of viewfinder optical system 15. This plate 30 is optically equivalent to optical low-pass filter 20, i.e., it has the equivalent optical length. It comprises a sheet of optical material such as quartz cut obliquely of its thickness into a pair of complementary pieces and joined by a cement layer along the plane of cutting. Alternatively, a pair of triangular prisms could be joined by a cement layer along adjacent sides. Preferably, the cemented layer is semi-transmissive so as to provide a semi-transmissive and semi-reflective surface. With this cemented layer 30a, the compensation plate 30 functions also as a beam splitter. A single photometric element 31, preferably having a relatively large area, exposed to the light beam is located laterally of the light beam traveling to ocular 19 directly in the center of the path of the reflected light beam from plate 30, rather obliquely, as in the prior art.

The light beam having passed through the objective 11 is upwardly reflected by the image-reflecting mirror 14 into the compensation plate 30. A certain amount of this light is directed to the focusing plate 17 and the rest is reflected by the semi-transmissive cement layer 30a laterally into the photometric element 31. In this way, a photoelectric output signal proportional to the amount of light passing through the objective 11 is obtained from the photometric element 31. The photoelectric output signal is applied to conventional circuitry in the camera for controlling the shutter speed and/or aperture size. Centre-priority light measuring, i.e., unequal weighting of light measurement that emphasizes the central portion of the image, can be thereby accommodated because the photometric element measures light straight, rather than obliquely, incident upon it.

In summary, the compensation filter of the single-lens reflex camera containing therein the optical low-pass filter serves also for light measuring to accommodate the centre-priority light measuring, permitting light measuring to be achieved accurately in proportion with light intensity of the individual object to be photographed regardless of the diffusion caused by the focusing plane of the focusing plate. Furthermore, such light measuring system prevents the entire mechanism from becoming bulky and permits a compact electronic camera to be realized.

The disclosure of Japanese Utility Model Application No. 1983-195450, laid open on July 17, 1985, Gazette No. 60 (1985)-104824, is incorporated fully herein by reference.

With this invention, the compensation plate 30 has the equivalent optical length with that of the low-pass filter 20 and high-frequency component is not removed at the viewfinder side. Consequently, the state of focusing at the viewfinder coincides with the state of focusing at the pick-up device, and with the presence of high-frequency component at the viewfinder side, focusing is achieved easily. This does not mean to prevent the compensation plate from having the same filter characteristics with that of the low-pass filter. That is, the compensation plate may have the same filter characteristics with that of the low-pass filter, but it is more desirable to simply compensate for the optical length of the low-pass filter 20, rather than for the compensation plate to have low-pass filter characteristics.

What is claimed is:

1. A photometric optical system incorporated in a single-lens reflex electronic photographic camera having an optical low-pass filter located in the path of the light beam coming from an object to be photographed, behind an image-reflecting mirror and in front of the image-pickup device, the system comprising:
    a viewfinder having a light path extending along an optical axis from the mirror through a focusing plane to an ocular;

a compensation filter located in the light path between the mirror and the focusing plane, the compensation filter having an equivalent optical length with the optical low-pass filter and having a semi-transmissive surface extending obliquely to the optical axis to divert a portion of the light entering the compensation filter away from the optical axis; and a photometric element disposed directly in the path of the diverted light so as to sense the intensity of the light passing through the compensation filter.

2. The optical system of claim 1, in which the compensation filter comprises a sheet of optical material cut obliquely of its thickness into a pair of complementary pieces which are joined by a cement layer along the plane of cutting.

3. The optical system of claim 2, in which the cement layer is semi-transmissive.

4. The optical system of claim 1, in which the compensation filter comprises a pair of prisms which are joined by a cement layer along abutting sides.

5. The optical system of claim 4, in which the cement layer is semi-transmissive.

6. A single-lens reflex electronic photographic camera comprising:

an objective defining an optical axis;

a self-scanning photoconductive pickup device along the optical axis, the pickup device comprising a plurality of photoconductive elements arranged in an array and adapted to store individual electronic charges representative of picture elements;

a viewfinder mirror movable between a first position in which the mirror is out of the light path between the objective and the pickup device and a second position in which the mirror blocks the light path between the objective and the pickup device;

a low-pass optical filter disposed along the optical axis between the mirror and the pickup device;

a shutter disposed along the optical axis between the low-pass filter and the pickup device;

a viewfinder optical system disposed along the path of the light reflected by the mirror in the second position;

a compensation filter disposed along the light path of the viewfinder optical system, the compensation filter having an equivalent optical length with the optical low-pass filter;

a single photometric element laterally disposed relative to the path of light through the viewfinder optical system; and means for diverting a portion of the light passing through the compensation filter to the photometric element to permit the photometric element to generate an electrical signal representative of the intensity of the light passing through the objective.

* * * * *